US010792976B2

(12) United States Patent
Wada (10) Patent No.: US 10,792,976 B2
(45) Date of Patent: Oct. 6, 2020

(54) VEHICLE CABIN AIR REGISTER (71) Applicant: TOYOTA JIDOSHA KABUSHIKI KAISHA, Toyota-shi, Aichi-ken (JP)

(72) Inventor: Toshinao Wada, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 200 days.

(21) Appl. No.: 14/989,481

(22) Filed: Jan. 6, 2016

(65) Prior Publication Data
US 2016/0200167 A1 Jul. 14, 2016

(30) Foreign Application Priority Data

Jan. 13, 2015 (JP) ................................. 2015-004383

(51) Int. Cl.
B60H 1/00 (2006.01)
B60H 1/34 (2006.01)
(52) U.S. Cl.
CPC ....... *B60H 1/00664* (2013.01); *B60H 1/0065* (2013.01); *B60H 1/00564* (2013.01); *B60H 1/00871* (2013.01); *B60H 1/3414* (2013.01); *B60H 1/3421* (2013.01); *B60H 2001/00707* (2013.01); *B60H 2001/00721* (2013.01); *B60H 2001/3471* (2013.01)
(58) Field of Classification Search
CPC .... F17D 3/00; B60H 1/24; B60H 1/34; B60H 1/00664; B60H 2001/00707; B60H 1/00871; F24F 13/15; F24F 13/14
USPC .............. 137/551; 454/152, 155, 154; 55/18
See application file for complete search history.

(56) References Cited

U.S. PATENT DOCUMENTS 3,552,295 A * 1/1971 Armstrong ........... B60H 1/3421
454/315
3,662,668 A * 5/1972 Johnson ............... B60H 1/3428
454/316
(Continued)

FOREIGN PATENT DOCUMENTS

FR 3004997 A1 10/2014
JP H08-080731 A 3/1996
(Continued)

OTHER PUBLICATIONS

Aug. 8, 2017 Office Action issued in European Patent Application No. 16150805.6.

*Primary Examiner* — Edelmira Bosques
*Assistant Examiner* — Frances F. Hamilton
(74) *Attorney, Agent, or Firm* — Oliff PLC (57) ABSTRACT A vehicle cabin air register includes a tube shaped retainer disposed in a register opening, a bezel connected to the retainer, and a first fin axially supported by a pivot axis at an inner side of the retainer. A restricting mechanism restricts a pivot range of the first fin. The vehicle cabin air register also includes a second fin including a pair of second fin main bodies, an operation knob attached to a center portion of the first fin, a first flow path, and a second flow path. A minimum gap of the first flow path is narrower than a minimum gap of the second flow path. When the register is in a restricted state, the downstream end of the operation knob and the downstream end of the other second fin main body of the pair of second fin main bodies are positioned downstream of the bezel.

3 Claims, 7 Drawing Sheets (56) References Cited

U.S. PATENT DOCUMENTS

| | | | | |
|---|---|---|---|---|
| 3,701,311 A * | 10/1972 | McLarty | B60H 1/3428 | 454/319 |
| 4,653,386 A * | 3/1987 | Hayakawa | B60H 1/00871 | 454/121 |
| 4,936,159 A * | 6/1990 | Kallio | B60H 1/0065 | 74/501.5 R |
| 5,154,893 A * | 10/1992 | Nakade | A61L 9/122 | 422/122 |
| 5,599,230 A * | 2/1997 | Naruse | B60H 1/3421 | 454/155 |
| 5,766,070 A * | 6/1998 | Schwarz | B60H 1/3421 | 454/155 |
| 5,921,860 A * | 7/1999 | Marsden | B60H 1/3414 | 454/152 |
| 5,938,527 A * | 8/1999 | Oshima | F24F 1/01 | 454/344 |
| 6,004,204 A * | 12/1999 | Luxton | F24F 13/062 | 454/261 |
| 7,780,508 B2 * | 8/2010 | Okuno | B60H 1/3428 | 454/109 |
| 8,113,229 B2 * | 2/2012 | Bosma | B60H 1/3421 | 137/353 |
| 9,162,551 B2 * | 10/2015 | Yamamoto | B60H 1/3428 | |
| 9,555,685 B2 * | 1/2017 | Mercey | B60H 1/3421 | |
| 9,555,692 B2 * | 1/2017 | Shibata | B60H 1/3421 | |
| 9,701,176 B2 * | 7/2017 | Jang | B60H 1/3428 | |
| 2002/0178744 A1 * | 12/2002 | Tanabe | B60H 1/3421 | 62/407 |
| 2004/0092225 A1 * | 5/2004 | Gehring | B60H 1/3421 | 454/155 |
| 2004/0226184 A1 * | 11/2004 | Honda | B08B 5/02 | 34/218 |
| 2006/0052050 A1 * | 3/2006 | Malott | B60H 1/3407 | 454/307 |
| 2006/0205337 A1 * | 9/2006 | Honda | B08B 5/02 | 454/237 |
| 2008/0254731 A1 * | 10/2008 | Bowler | B60H 1/00671 | 454/69 |
| 2009/0286462 A1 * | 11/2009 | Goto | B60H 1/3428 | 454/155 |
| 2010/0124876 A1 * | 5/2010 | Yu | B60H 1/3428 | 454/155 |
| 2011/0237176 A1 * | 9/2011 | Shibata | B60H 1/3428 | 454/330 |
| 2012/0291893 A1 * | 11/2012 | Yamamoto | B60H 1/3428 | 137/551 |
| 2014/0227958 A1 * | 8/2014 | Baker | B60H 1/00842 | 454/75 |
| 2015/0031278 A1 * | 1/2015 | Kim | B60H 1/3421 | 454/152 |
| 2015/0174989 A1 * | 6/2015 | Oe | B60H 1/34 | 454/152 |
| 2016/0313025 A1 * | 10/2016 | Nemoto | F24F 13/06 | |

FOREIGN PATENT DOCUMENTS

| | | |
|---|---|---|
| JP | 2009-023585 A | 2/2009 |
| JP | 2011-148455 A | 8/2011 |
| JP | 3176607 U | 6/2012 |
| JP | 2013-112255 A | 6/2013 |
| JP | 2013-112256 A | 6/2013 |

* cited by examiner

VEHICLE CABIN AIR REGISTER

CROSS-REFERENCE TO RELATED APPLICATION

This application is based on and claims priority under 35 USC 119 from Japanese Patent Application No. 2015-004383 filed on Jan. 13, 2015, the disclosure of which is incorporated by reference herein.

BACKGROUND

Technical Field

The present invention relates to a register for use in a vehicle.

Related Art

Registers for use in a vehicle are known that have structures in which an operation knob is attached to a fin, and the fin is inclined by manually pivoting the operation knob (for example, Japanese Utility Model Registration No. 3176607, and Japanese Patent Application Laid-Open (JP-A) No. 2011-148455). In such structures, for example, a projection amount of the fin toward a vehicle cabin side with respect to a pivot axis of the fin that supports the operation knob is sometimes set short from the perspective of styling or the like (see, for example, JP-A No. 2011-148455).

However, in such cases, for example, there is a possibility of the fin being damaged if pressed in the vicinity of the pivot axis at an extension direction center portion in the vicinity of a vehicle cabin side end portion of the fin, in a front view of the register.

SUMMARY

In consideration of the above circumstances, an object of the present invention is to obtain a register capable of preventing or effectively suppressing damage to a fin during operation of an operation knob.

A register of a first aspect of the present invention includes: a tube shaped retainer that is disposed in a register opening overlooking a vehicle cabin and that forms an air duct; a first fin that is axially supported at an inner side of the retainer so as to be capable of pivoting, and that is capable of being set in a standard orientation disposed along a tube axis of the retainer; a restricting mechanism that restricts a pivot range of the first fin; a second fin that includes a second fin main body that is disposed alongside and parallel to the first fin in a plate thickness direction of the first fin, that is capable of pivoting integrally with the first fin, and that, in a standard state in which the first fin is set in the standard orientation, has a leading end position at the vehicle cabin side of the second fin main body set further toward the vehicle cabin side than a leading end position at the vehicle cabin side of the first fin; an operation knob that is attached to an extension direction center portion of the first fin in a front view of the register, that extends out toward the vehicle cabin side, and that, in the standard state, has a leading end position at the vehicle cabin side that is set further toward the vehicle cabin side than the leading end position at the vehicle cabin side of the second fin main body, wherein a minimum gap between a location of the operation knob further to the vehicle cabin side than a pivot axis of the first fin and the second fin main body is set narrower than a minimum gap between the first fin and the second fin main body, and a leading end at the vehicle cabin side of the operation knob and a leading end at the vehicle cabin side of the second fin main body are set such that positions in a direction along the tube axis of the retainer are aligned with each other in a restricted state, in which the leading end at the vehicle cabin side of the operation knob has pivoted to the opposite side to the second fin main body side, and the first fin is restricted from pivoting by the restricting mechanism.

In the above configuration, the second fin includes the second fin main body that is disposed alongside and parallel to the first fin in the plate thickness direction of the first fin, and is capable of pivoting integrally with the first fin. In the standard state in which the first fin is set in the standard orientation, the leading end position at the vehicle cabin side of the second fin main body is set further toward the vehicle cabin side than the leading end position at the vehicle cabin side of the first fin. This enables the first fin to be less noticeable in terms of styling. In a front view of the register, the operation knob is attached to the extension direction center portion of the first fin, and the operation knob extends out toward the vehicle cabin side. This enables the first fin and the second fin to be pivoted by operating the operation knob from the vehicle cabin side.

The minimum gap between the location of the operation knob further to the vehicle cabin side than the pivot axis of the first fin and the second fin main body is set narrower than the minimum gap between the first fin and the second fin main body. Thus, in a front view of the register, the fingers of an operator are less liable to enter between the extension direction center portion of the first fin and the second fin main body. Thus, in a front view of the register, this prevents or effectively suppresses pressing at the extension direction center portion of the first fin toward the vicinity of the pivot axis. This accordingly prevents or effectively suppresses damage to the first fin caused by such pressing.

In the standard state, the leading end position at the vehicle cabin side of the operation knob is set further toward the vehicle cabin side than the leading end position at the vehicle cabin side of the second fin main body. Thus, even if a gap between the location of the operation knob that is further to the vehicle cabin side than the pivot axis of the first fin, and the second fin main body is narrow as described above, the operator can easily operate a leading end portion at the vehicle cabin side of the operation knob in the standard state using their fingers. This enables a point at which the operation knob is pressed by the fingers of the operator to be shifted further to the vehicle cabin side along the pivot axis of the first fin, and enables the first fin to be pivoted easily.

Furthermore, the leading end at the vehicle cabin side of the operation knob and the leading end at the vehicle cabin side of the second fin main body are set such that the positions in a direction along the tube axis of the retainer are aligned with each other in the restricted state, in which the leading end at the vehicle cabin side of the operation knob has pivoted to the opposite side to the second fin main body side, and the first fin is restricted from pivoting by the restricting mechanism. Thus, when the first fin reaches the position at which pivoting is restricted, and the leading end at the vehicle cabin side of the operation knob and the leading end at the vehicle cabin side of the second fin main body are aligned at positions in a direction running along the tube axis of the retainer, the fingers of the operator contact the second fin main body, and so the fingers bounce off toward the vehicle cabin side. In such cases, a situation in which the first fin in the restricted state, in which pivoting is restricted, is further pressed toward the side at which pivoting is restricted can be avoided, and so damage to the first fin is prevented or effectively suppressed.

A register of a second aspect of the present invention has the configuration of the first aspect, wherein the second fin includes a pair of the second fin main bodies that are each respectively disposed alongside and parallel on either side of the first fin in the plate thickness direction of the first fin.

In the above configuration, in a front view of the register, even when the operation knob is pivoted toward one second fin main body side or pivoted toward the other second fin main body side in the standard state, the fingers of the operator contact the second fin main body at the timing at which the pivoting of the first fin is restricted, and these fingers bounce off toward the vehicle cabin side.

As explained above, the register of the present invention has an excellent advantageous effect of enabling damage to the fin during operation of the operation knob to be prevented or effectively suppressed.

BRIEF DESCRIPTION OF THE DRAWINGS

Exemplary embodiments of the present invention will be described in detail based on the following figures, wherein.

DETAILED DESCRIPTION

Explanation follows regarding a register according to an exemplary embodiment of the present invention, with reference to FIG. 1 to FIG. 7. In the drawings, the arrow FR indicates the vehicle front side, the arrow UP indicates the vehicle upper side, and the arrow W indicates the vehicle width direction, as appropriate. In the below explanation, unless specifically stated otherwise, simple reference to the up-down direction refers to up-down viewed from in front of the register, and unless specifically stated otherwise, simple reference to the left-right direction refers to left-right viewed from in front of the register.

Configuration of Exemplary Embodiment

Figure 1:
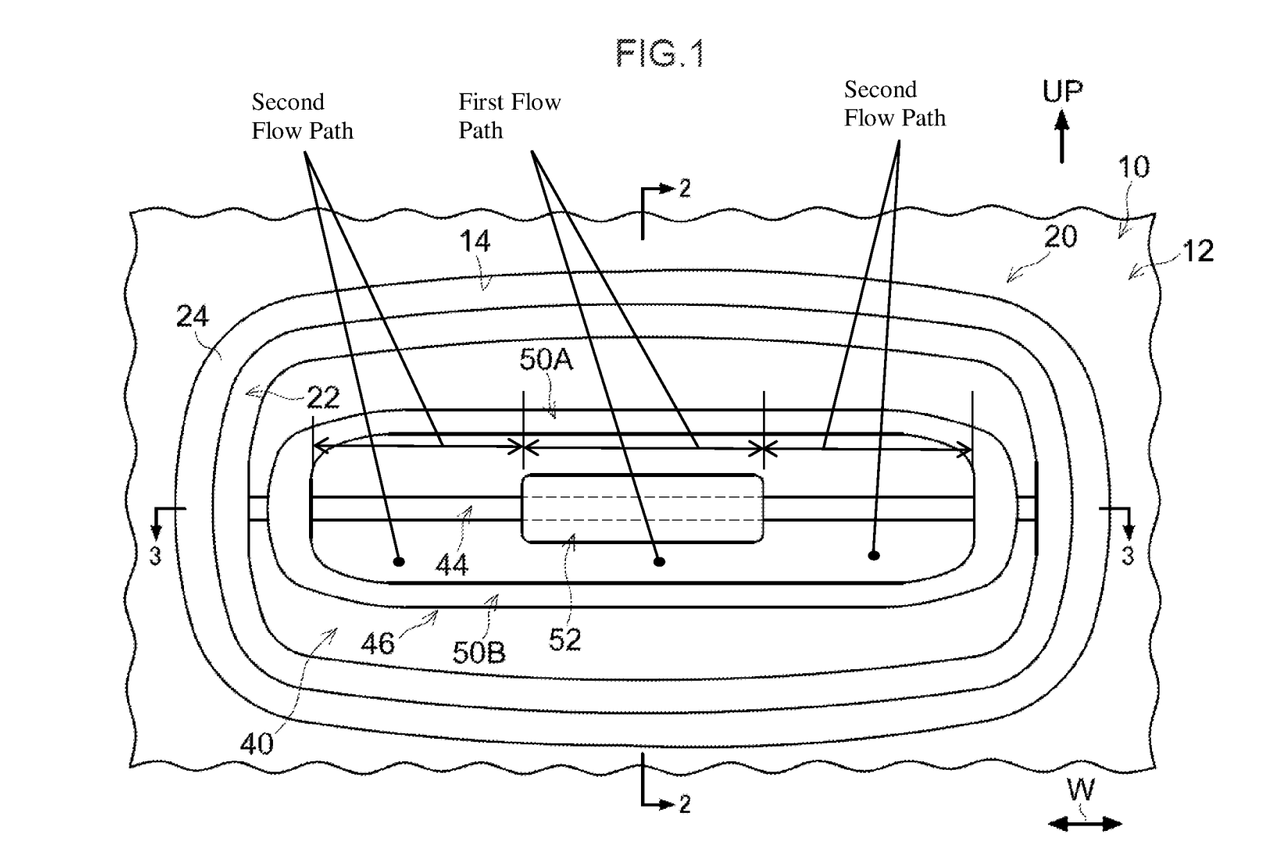
FIG. 1 is a schematic front view illustrating a register according to an exemplary embodiment of the present invention, in a state viewed from a vehicle cabin side.
Figure 2:
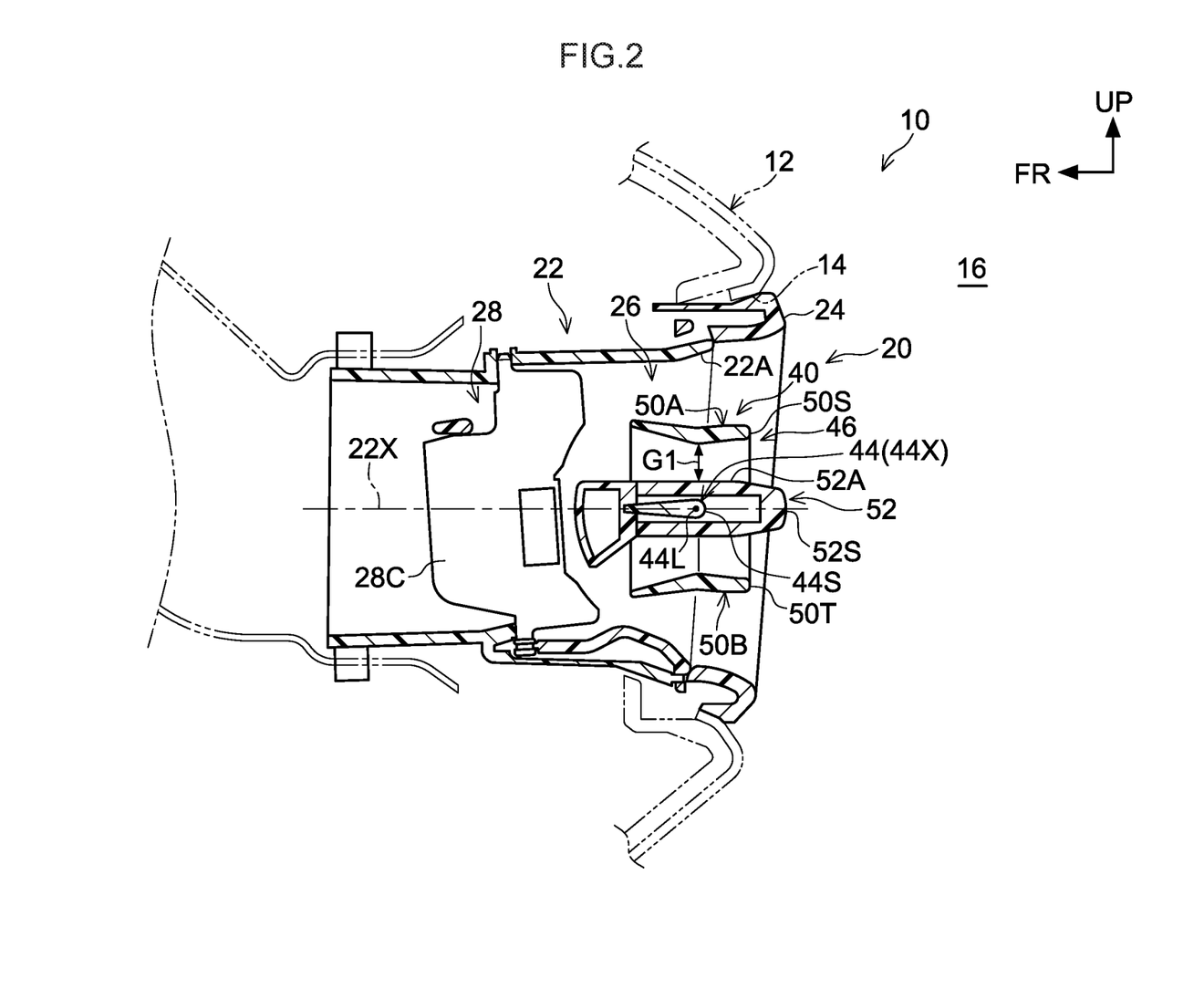
FIG. 2 is a vertical cross-section illustrating a state sectioned along line 2-2 in FIG. 1.
Figure 3:
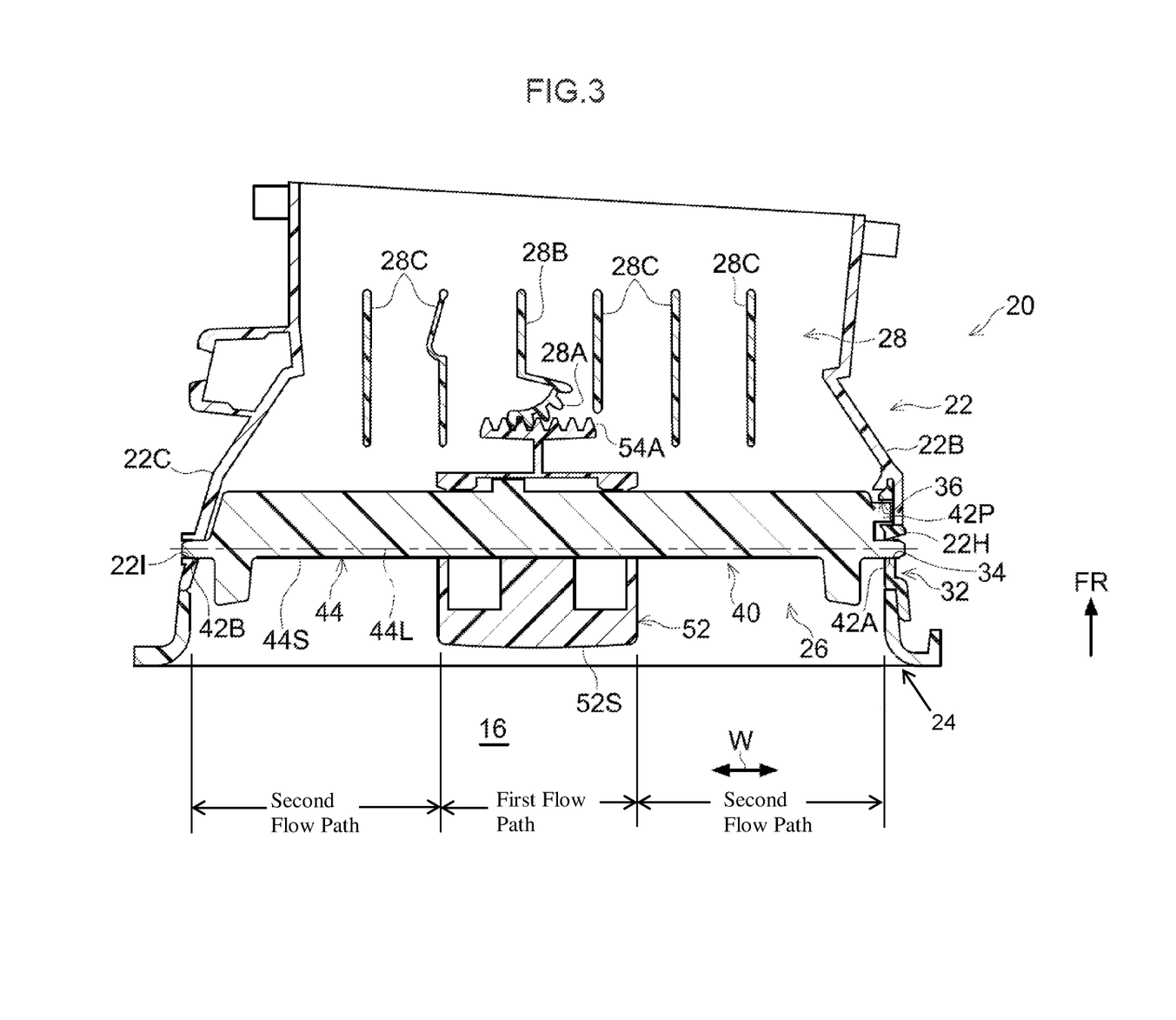
FIG. 3 is a horizontal cross-section illustrating a state sectioned along line 3-3 in FIG. 1.

FIG. 1 is a schematic front view illustrating a register 20 according to the present exemplary embodiment, in a state viewed from a vehicle cabin inside. FIG. 2 is a vertical cross-section in a state sectioned along line 2-2 in FIG. 1, and FIG. 3 is a horizontal cross-section sectioned along line 3-3 in FIG. 1. Note that FIG. 1 illustrates a portion at a location at the vehicle width direction outside of a vehicle cabin front section 10, and the register 20 described in the present exemplary embodiment configures a side register.

As illustrated in FIG. 1, an instrument panel 12 is disposed in the vehicle cabin front section 10. An air conditioning unit (not illustrated in the drawings) is disposed at the vehicle front side of the instrument panel 12 (the far side of the page in FIG. 1). A register opening 14 that overlooks a vehicle cabin 16 (see FIG. 2) is formed piercing through the instrument panel 12. The register opening 14 is set with a longer length along the vehicle width direction than along the vehicle up-down direction. The register 20 is disposed in the register opening 14. The register 20 is connected to a main body section of the air conditioning unit, configures a location that blows out air that is temperature-adjusted by the main body section of the air conditioning unit, and has a flow direction adjustment function capable of distributing airflow inside the vehicle cabin.

Figure 4:
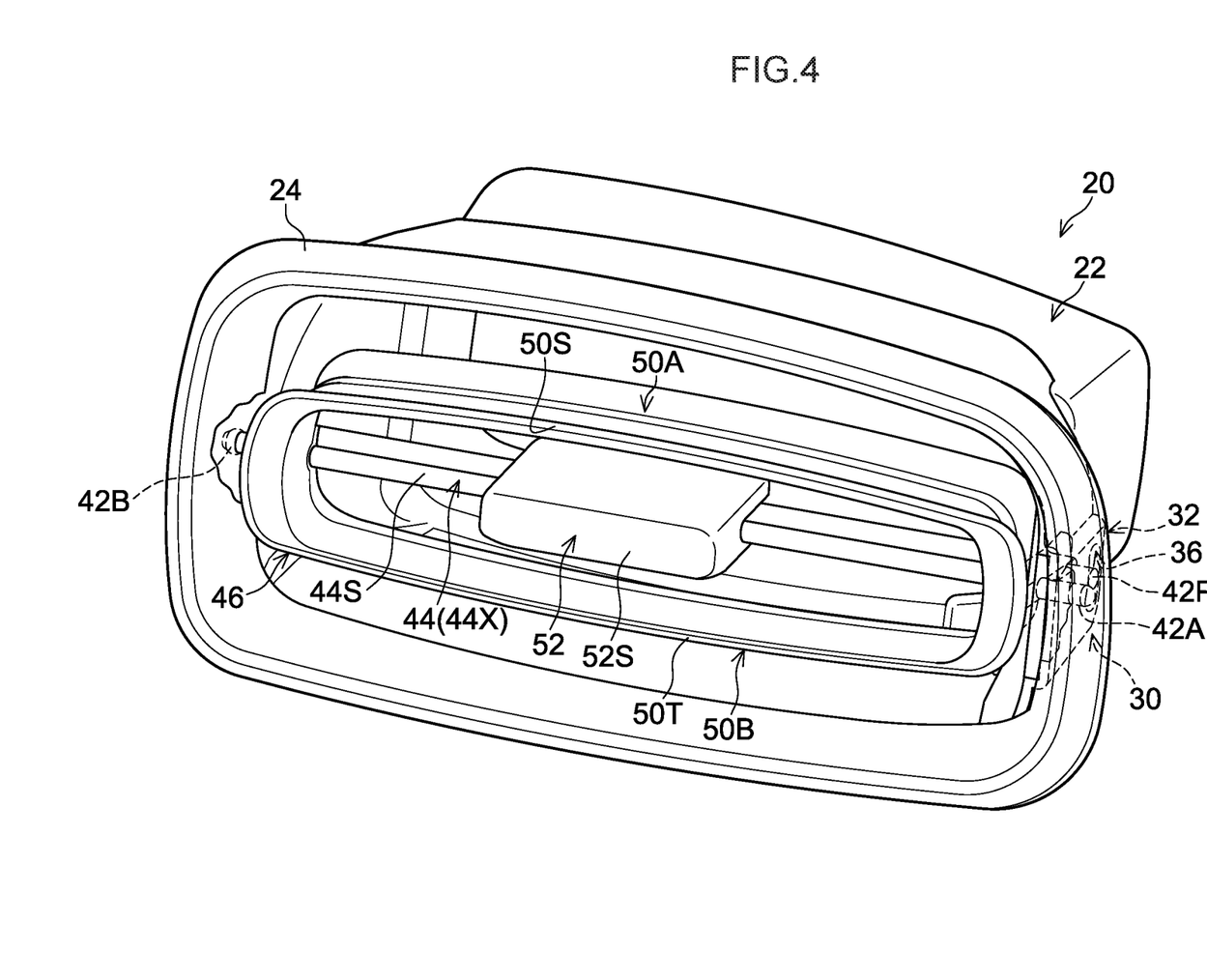
FIG. 4 is a schematic perspective view of the register in FIG. 1.
Figure 5:
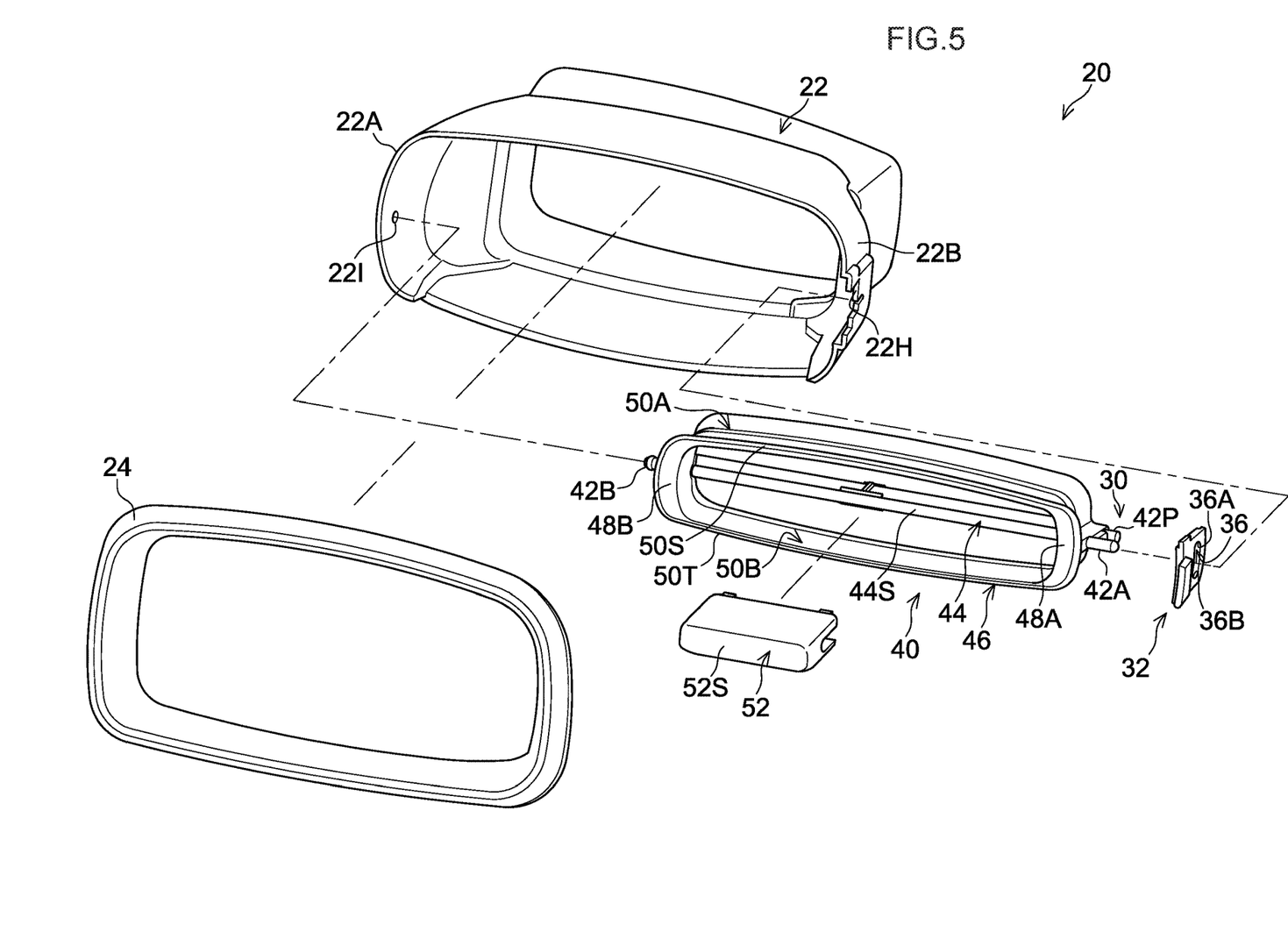
FIG. 5 is a schematic exploded perspective view illustrating an exploded portion of the register in FIG. 1.

As illustrated in FIG. 2, the register 20 is provided with a tube shaped retainer 22 that is disposed in the register opening 14 and forms an air duct. A direction running along a tube axis 22X of the retainer 22 is set along the vehicle front-rear direction. FIG. 4 is a schematic perspective view illustrating the register 20, and FIG. 5 is a schematic exploded perspective view illustrating part of the register 20. As illustrated in FIG. 4 and FIG. 5, the retainer 22 is formed in a substantially rectangular tube shape in a front view of the register, and is set with a longer length along the vehicle width direction than along the vehicle up-down direction.

A bezel 24 is attached to an open end portion 22A (see FIG. 5) at the vehicle cabin side of the retainer 22. Plural attaching tabs, not illustrated in the drawings, are formed at intervals along the vehicle width direction at an upper portion and a lower portion of the bezel 24. The attaching tabs are attached to attachment portions, not illustrated in the drawings, formed to the open end portion 22A at the vehicle cabin side of the retainer 22. As illustrated in FIG. 2, the open end portion 22A and the bezel 24 at the vehicle cabin 16 side of the retainer 22 are disposed adjacent to the register opening 14.

As illustrated in FIG. 2 and FIG. 3, a downstream side flow direction adjuster 26 is provided at the inner side and air duct downstream side of the retainer 22. The downstream side flow direction adjuster 26, described in detail later, is configured including a flow direction adjustment member 40 and an operation knob 52. An upstream side flow direction adjuster 28 is provided at the inner side and air duct upstream side of the retainer 22. The upstream side flow direction adjuster 28 has a known configuration and so detailed explanation is omitted. Although not illustrated in FIG. 1, FIG. 4, and FIG. 5, as illustrated in FIG. 2 and FIG. 3, plural upright fins 28B, 28C are axially supported by the retainer 22 so as to be capable of pivoting.

Figure 6:
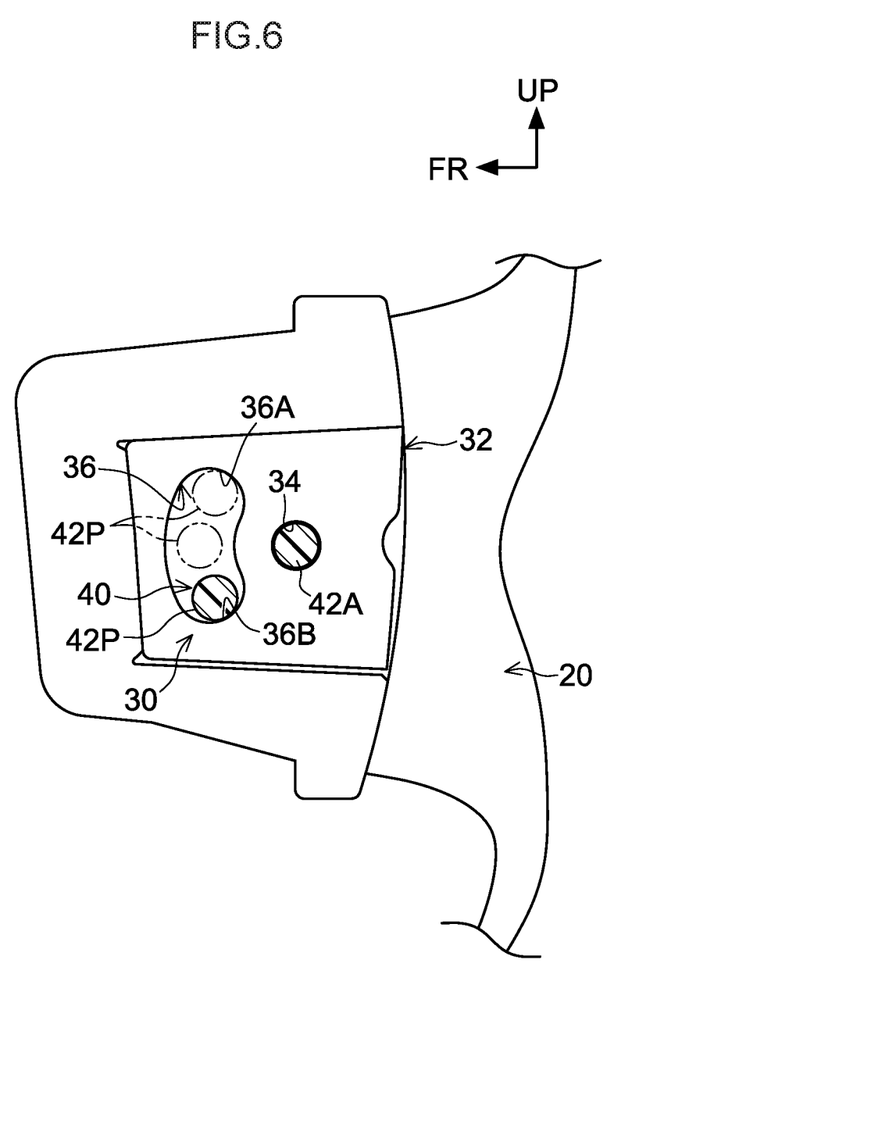
FIG. 6 is an enlarged side view illustrating part of a side portion at the right side in a front view of the register in FIG. 4, in an enlarged state viewed from the width direction inside of the register.

As illustrated in FIG. 5, a cutout portion 22H is formed at a vehicle cabin side end portion of an up-down direction intermediate portion of a side wall portion 22B at the right side of the retainer 22, and a plate 32 is attached so as to block a portion of the cutout portion 22H. FIG. 6 is a drawing illustrating an enlarged state of part of a side portion at the right side of the register 20 including the plate 32, as viewed from the vehicle width direction inside of the register. As illustrated in FIG. 6, a shaft bearing portion 34 is formed to the plate 32, and a guide hole 36 is formed piercing through the plate 32 at the opposite side of the shaft bearing portion 34 to the vehicle cabin side. The guide hole 36 is formed in a circular arc shape about the shaft bearing portion 34. As illustrated in FIG. 3, a shaft bearing portion 22I is formed to a side wall portion 22C at the left side of the retainer 22. The shaft bearing portion 22I is a portion set facing the shaft bearing portion 34 previously described.

A shaft 42A formed projecting out from a right side end portion of the flow direction adjustment member 40 is axially supported by the shaft bearing portion 34 of the plate 32 so as to be capable of rotating, and a shaft 42B formed projecting out from a left side end portion of the flow direction adjustment member 40 is axially supported by the shaft bearing portion 22I of the retainer 22 so as to be capable of rotating. A stopper pin 42P formed projecting out from the right side end portion of the flow direction adjustment member 40 is inserted through the guide hole 36 of the plate 32 so as to be capable of moving.

As illustrated in FIG. 5, a first fin 44, disposed with its length direction along the vehicle left-right direction, is formed to the flow direction adjustment member 40. The above-described shafts 42A, 42B are integrally formed at each end portion side of the first fin 44 in front view. The first fin 44 is thereby axially supported so as to be capable of pivoting at the inner side of the retainer 22. As illustrated in FIG. 2, the first fin 44 is capable of being set in a standard orientation 44X disposed along the tube axis 22X of the retainer 22 (the orientation illustrated in FIG. 2).

As illustrated in FIG. 5, the above-described stopper pin 42P is integrally set in the flow direction adjustment member 40 at the right side end portion side of the first fin 44. The stopper pin 42P is set at the opposite side of the shaft 42A to the vehicle cabin side. Downward pivoting of the first fin 44 is restricted by the stopper pin 42P abutting an inner peripheral upper end face 36A of the guide hole 36 (see FIG. 6), and upward pivoting of the first fin 44 is restricted by the stopper pin 42P abutting an inner peripheral lower end face 36B of the guide hole 36 (see FIG. 6). Namely, the stopper pin 42P, together with the inner peripheral upper end face 36A and the inner peripheral lower end face 36B of the guide hole 36 configure a restricting mechanism 30 that restricts the pivot range of the first fin 44.

The flow direction adjustment member 40 is also provided with a second fin 46 at the outer peripheral side of the first fin 44. The respective plate thicknesses of the first fin 44 and the second fin 46 may be set as appropriate, and the first fin 44 is preferably set thinner than the plate thickness of the second fin 46 from the perspective of styling. The second fin 46 is formed in a short tube shape that has a substantially rectangular shape with rounded corners (or a substantially oval shape) in a front view of the register, and is set with a longer length along the vehicle width direction than along the vehicle up-down direction. The respective length direction end portions of the first fin 44 are integrally connected to respective inner face sides at up-down direction intermediate portions of side portions 48A, 48B configuring respective left and right sides of the second fin 46. Outer face sides at the up-down direction intermediate portions of the side portions 48A, 48B are integrally connected to the shafts 42A, 42B. The second fin 46 is thereby capable of pivoting integrally with the first fin 44. The stopper pin 42P is integrally connected to the outer face side at the up-down direction intermediate portion of the side portion 48A configuring the right side of the second fin 46.

The second fin 46 is provided with a pair of second fin main bodies 50A, 50B that are each respectively disposed alongside and parallel to either side of the first fin 44 in the plate thickness direction of the first fin 44. As illustrated in FIG. 2, in a standard state in which the first fin 44 is set in the standard orientation 44X, positions of leading ends 50S, 50T at the vehicle cabin side of the second fin main bodies 50A, 50B of the second fin 46 are set further toward the vehicle cabin 16 side (vehicle rear side) than a position of a leading end 44S at the vehicle cabin side of the first fin 44.

As illustrated in FIG. 1, the operation knob 52 is attached to an extension direction center portion of the first fin 44 of the flow direction adjustment member 40 in a front view of the register. Although the operation knob 52 is capable of sliding along the vehicle width direction, a slide range of the operation knob 52 is within a relatively small range at the extension direction center portion of the first fin 44.

As illustrated in FIG. 3, a rack 54A is integrally provided to a vehicle front side of the operation knob 52. The rack 54A is disposed such that plural teeth, further to the vehicle front side than the first fin 44, are oriented toward the vehicle front side in a row along the vehicle width direction. A fan-shaped gear wheel 28A is enmeshed with the rack 54A. The fan shaped gear wheel 28A is provided to the upright fin 28B configuring the upstream side flow direction adjuster 28. The upright fins 28C disposed alongside either side of the upright fin 28B are coupled to the upright fin 28B by a coupling mechanism, not illustrated in the drawings.

Figure 7:
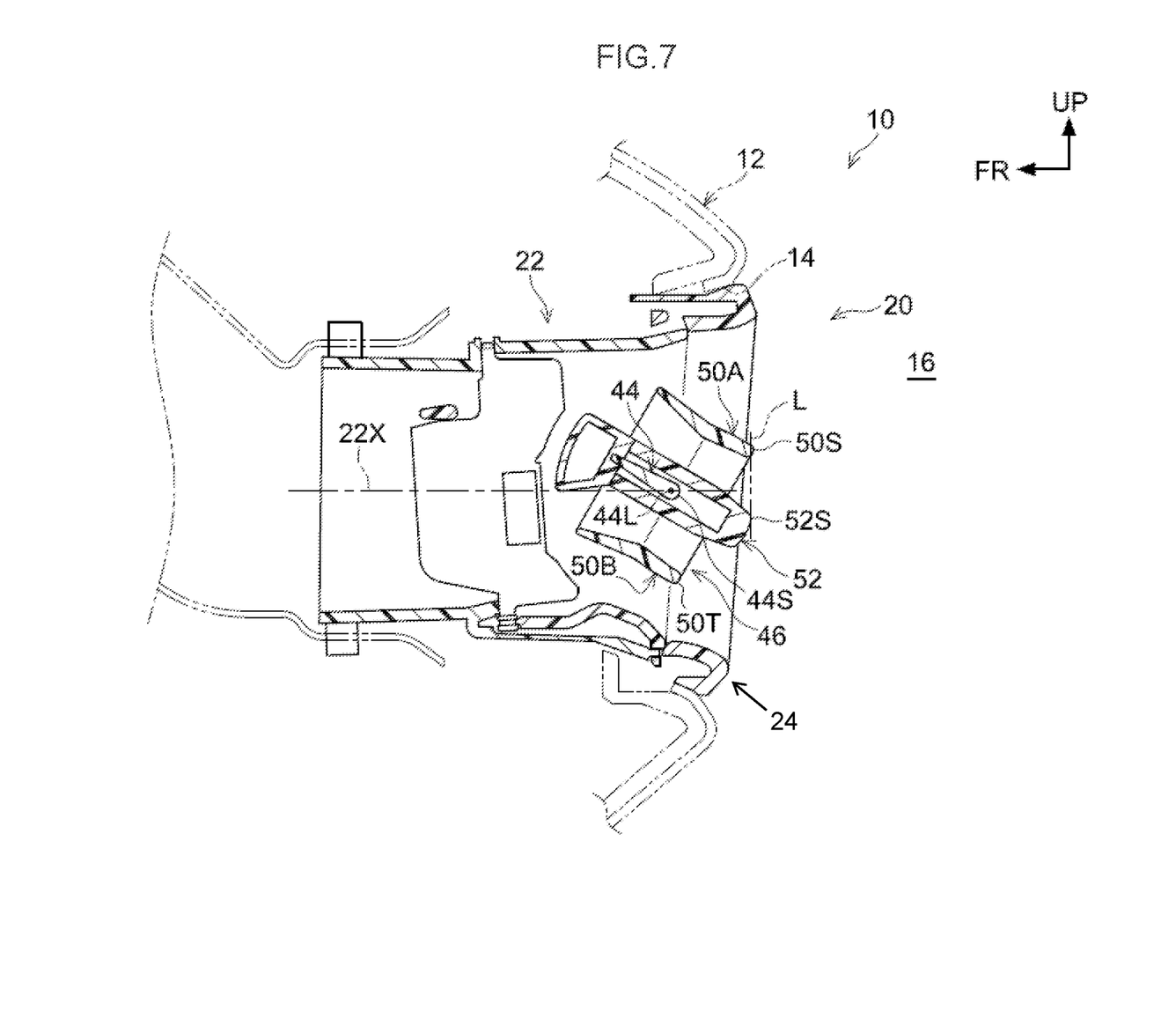
FIG. 7 is an operation view of the same cross-section as in FIG. 2, illustrating a state in which the first fin in FIG. 2 is inclined at a maximum toward the lower side.

Although detailed explanation is omitted herein, when the operation knob 52 is operated along the left-right direction, the rack 54A and the fan shaped gear wheel 28A are displaced, thereby changing the orientation of the upright fins 28B, 28C. As illustrated in FIG. 2 and FIG. 7, the orientation of the first fin 44 and the second fin main bodies 50A, 50B is changed by operating the operation knob 52 in the up-down direction.

As illustrated in FIG. 2, in the operation knob 52, a minimum gap between a location 52A further to the vehicle cabin 16 side than a pivot axis 44L of the first fin 44, and the second fin main bodies 50A, 50B (see the gap dimension G1) is set narrower (specifically, at a dimension at which the fingers of an operator do not enter) than a minimum gap between the first fin 44 and the second fin main bodies 50A, 50B.

In the standard state illustrated in FIG. 2 in which the operation knob 52 extends toward the vehicle cabin 16 side, the position of a leading end 52S at the vehicle cabin side is set further to the vehicle cabin 16 side (vehicle rear side) than the positions of the leading ends 50S, 50T at the vehicle cabin side of the second fin main bodies 50A, 50B.

As illustrated in FIG. 7, the leading end 52S at the vehicle cabin side of the operation knob 52, and the leading end 50S at the vehicle cabin side of the second fin main body 50A at the upper side of the leading end 52S are set such that vehicle front-rear direction positions (positions in a direction running along the tube axis 22X of the retainer 22) are aligned with each other in a restricted state, in which the leading end 52S at the vehicle cabin side of the operation knob 52 has pivoted to the opposite side to the second fin main body 50A side, and the first fin 44 is restricted from pivoting by the restricting mechanism 30 (see FIG. 6) (see the straight line L running along the vehicle up-down direction).

The leading end 52S at the vehicle cabin side of the operation knob 52 illustrated in FIG. 2, and the leading end 50T at the vehicle cabin side of the second fin main body 50B at the lower side of the leading end 52S are set such that vehicle front-rear direction positions (positions in a direction running along the tube axis 22X of the retainer 22) are aligned with each other in a restricted state, in which the leading end 52S at the vehicle cabin side of the operation knob 52 has pivoted to the opposite side to the second fin main body 50B side (namely, the upper side), and the first fin 44 is restricted from pivoting by the restricting mechanism 30 (see FIG. 6).

Operation and Advantageous Effects of Exemplary Embodiment

Explanation follows regarding operation and advantageous effects of the above exemplary embodiment In the present exemplary embodiment, the second fin 46 is provided with the second fin main bodies 50A, 50B that are disposed alongside and parallel to the first fin 44 in the plate thickness direction of the first fin 44, and is capable of pivoting integrally with the first fin 44. In the standard state in which the first fin 44 is set in the standard orientation 44X, the positions of the leading ends 50S, 50T at the vehicle cabin side of the second fin main bodies 50A, 50B are set further toward the vehicle cabin 16 side than the position of the leading end 44S at the vehicle cabin side of the first fin 44. This enables the first fin 44 to be less noticeable in terms of styling. In a front view of the register, the operation knob 52 is attached to the extension direction center portion of the first fin 44, and the operation knob 52 extends out toward the vehicle cabin 16 side. This enables the first fin 44 and the second fin 46 to be pivoted by operating the operation knob 52 from the vehicle cabin 16 side.

In the operation knob 52, the minimum gap between the location 52A further to the vehicle cabin side than the pivot axis 44L of the first fin 44, and the second fin main bodies 50A, 50B (see the gap dimension G1) is set narrower than the minimum gap between the first fin 44 and the second fin main bodies 50A, 50B. Thus, in a front view of the register, the fingers of the operator are less liable to enter between the extension direction center portion of the first fin 44 and the second fin main bodies 50A, 50B. Thus, in a front view of the register, this prevents or effectively suppresses pressing at the extension direction center portion of the first fin 44 toward the vicinity of the pivot axis 44L. This accordingly prevents or effectively suppresses damage to the first fin 44 caused by such pressing.

Note that locations at the side direction sides of the operation knob 52 of the first fin 44 illustrated in FIG. 1 are less liable to deform than the extension direction center portion of the first fin 44, and design in order to secure rigidity is easier. Thus, even supposing that the fingers of the operator enter between the first fin 44 at the side direction sides of the operation knob 52 and the second fin main bodies 50A, 50B and operating force acts on the first fin 44, the first fin 44 is not easily damaged.

As illustrated in FIG. 2, in the standard state, the position of the leading end 52S at the vehicle cabin side of the operation knob 52 is set further to the vehicle cabin 16 side than the positions of the leading ends 50S, 50T at the vehicle cabin side of the second fin main bodies 50A, 50B. Thus, even if the gap between the location 52A at the vehicle cabin side of the operation knob 52 and the second fin main bodies 50A, 50B is narrower than the pivot axis 44L of the first fin 44 as described above, the operator can easily finger-operate a leading end portion at the vehicle cabin side of the operation knob 52 in the standard state. This enables a point at which the operation knob 52 is pressed by the fingers of the operator to be shifted further to the vehicle cabin 16 side along the pivot axis 44L of the first fin 44, enables the first fin 44 to be pivoted easily, and also enables load during operation to be allowed to escape along the pivot axis 44L of the first fin 44.

As illustrated in FIG. 7, the leading end 52S at the vehicle cabin side of the operation knob 52, and the leading end 50S at the vehicle cabin side of the second fin main body 50A at the upper side of the leading end 52S are set such that the vehicle front-rear direction positions (positions in a direction running along the tube axis 22X of the retainer 22) are aligned with each other in the restricted state, in which the leading end 52S at the vehicle cabin side of the operation knob 52 has pivoted to the opposite side to the second fin main body 50A side (namely, the lower side), and the first fin 44 is restricted from pivoting by the restricting mechanism 30 (see FIG. 6) (see the double-dotted dashed line L). Thus, when the first fin 44 reaches a position where pivoting toward the lower side is restricted (in other words, a state inclined at a maximum angle toward the lower side), the fingers of the operator contact the leading end 50S at the vehicle cabin side of the second fin main body 50A, or a portion in the vicinity thereof, and so the fingers bounce off toward the vehicle cabin 16 side. In such cases, a situation in which the first fin 44 in the restricted state, in which pivoting toward the lower side is restricted, is further pressed toward the lower side can be avoided, and so damage to the first fin 44 is prevented or effectively suppressed.

Similarly, the leading end 52S at the vehicle cabin side of the operation knob 52 illustrated in FIG. 2, and the leading end 50T at the vehicle cabin side of the second fin main body 50B at the lower side of the leading end 52S are set such that vehicle front-rear direction positions (positions in a direction running along the tube axis 22X of the retainer 22) are aligned with each other in the restricted state, in which the leading end 52S at the vehicle cabin side of the operation knob 52 has pivoted to the opposite side to the second fin main body 50B side (namely, the upper side), and the first fin 44 is restricted from pivoting by the restricting mechanism 30 (see FIG. 6). Thus, when the first fin 44 reaches a position where pivoting toward the upper side is restricted (in other words, a state inclined at a maximum angle toward the upper side), the fingers of the operator contact the leading end 50T at the vehicle cabin side of the second fin main body 50B, or a portion in the vicinity thereof, and so the fingers bounce off toward the vehicle cabin 16 side. In such cases, a situation in which the first fin 44, in the restricted state in which pivoting toward the upper side is restricted is further pressed toward the upper side can be avoided, and so damage to the first fin 44 is prevented or effectively suppressed.

As explained above, the register of the present invention enables damage to the first fin 44 during operation of the operation knob 52 to be prevented or effectively suppressed.

To explain further, for example, when it is desirable to make the first fin 44 illustrated in FIG. 1 less noticeable in terms of styling, a conceivable measure would be to configure the first fin 44 thinner; however, if the first fin 44 were made thinner, then measures against damage to the first fin 44 during operation would become more important by a proportionate amount. In contrast, in the present exemplary embodiment, the length direction center portion of the first fin 44 is essentially not pressed downward or pressed upward due to the above-described operation, thereby enabling damage to the first fin 44 to be prevented or effectively suppressed.

Supplementary Explanation of Exemplary Embodiment

In the above exemplary embodiment, the register 20 is configured as a side register; however, the register applied with the present invention may, for example, be a register such as a side register disposed at another location of the vehicle cabin front section, or disposed at a location other than the vehicle cabin front section, such as a vehicle cabin rear section.

In the above exemplary embodiment, the first fin 44 and the second fin main bodies 50A, 50B are disposed so as to extend along the lateral direction in a front view of the register; however, as a modified example of the above exemplary embodiment, a first fin and a second fin main body may be disposed so as to extend along the vertical direction in a front view of the register.

In the present exemplary embodiment, the second fin 46 is provided with the pair of second fin main bodies 50A, 50B that are each respectively disposed alongside and parallel to either side of the first fin 44 in the plate thickness direction of the first fin 44; however, a second fin may be configured provided with a single second fin main body disposed alongside and parallel to a first fin in the plate thickness direction of the first fin. As a modified example of the above exemplary embodiment, for example, a configuration may be applied in which the position of a lower wall portion of a retainer (22) is set at the position of the second fin main body 50B in FIG. 2, and a second fin is formed with locations of the second fin 46 of the above exemplary embodiment removed that are further to the lower side than the first fin 44. As another modified example of the above exemplary embodiment, for example, a configuration may be applied in which the position of an upper wall portion of a retainer (22) is set at the position of the second fin main body 50A in FIG. 2, and a second fin is formed with locations of the second fin 46 of the above exemplary embodiment removed that are further to the upper side than the first fin 44.

The concept in the first aspect that "positions in a direction along the tube axis of the retainer are aligned with each other" includes cases in which the positions are completely aligned with each other in the direction running along the tube axis of the retainer. The concept also includes cases in which, as in the above exemplary embodiment, although the positions cannot be said to be completely aligned with each other in the direction running along the tube axis of the retainer, basically the same operation and advantageous effects can be obtained as when the positions are completely aligned with each other, and the positions may be considered as substantially aligned with each other in the direction running along the tube axis of the retainer.

Note that the above exemplary embodiment and the plural modified examples described above may be combined and implemented as appropriate.

Examples of the present invention have been explained above; however the present invention is not limited thereto, and obviously various other modifications may be implemented within a scope not departing from the spirit of the present invention.

What is claimed is:

1. A vehicle cabin air register comprising:
    a tube shaped retainer disposed in a register opening and forming an air duct along a tube axis;
    a bezel connected to the retainer;
    a first fin axially supported by a pivot axis at an inner side of the retainer, the first fin having an upstream end, a downstream end, and a first fin axis, the first fin axis defined between the upstream and downstream ends of the first fin, the first fin configured to be in a standard state when the first fin axis is disposed along the tube axis;
    a restricting mechanism restricting a pivot range of the first fin;
    a second fin including a pair of second fin main bodies disposed alongside the first fin and oriented in a parallel direction on either side of the first fin in a plate thickness direction of the first fin, the second fin being configured to pivot integrally with the first fin, each second fin main body of the pair of second fin main bodies having an upstream end and a downstream end such that when the first fin is in the standard state, the downstream end of each second fin main body is set further toward a vehicle cabin than the downstream end of the first fin;
    an operation knob attached to a center portion of the first fin, the operation knob having an upstream end and a downstream end, the downstream end of the operation knob extending toward the vehicle cabin such that when the first fin is in the standard state, the downstream end of the operation knob is set further towards the vehicle cabin downstream than the downstream end of each second fin main body of the pair of second fin main bodies;
    a first flow path and a second flow path, the first flow path being positioned downstream of the pivot axis and between the operation knob and one second fin main body of the pair of second fin main bodies, the second flow path being positioned between the first fin and the one second tin main body of the pair of second fin main bodies; and
    a minimum gap of the first flow path being narrower than a minimum gap of the second flow path,
    wherein when the register is in a restricted state, the operation knob is pivoted towards a side of the one second fin main body of the pair of second fin main bodies such that the downstream end of the operation knob and the downstream end of an other second fin main body of the pair of second fin main bodies are aligned with each other along a plane perpendicular to the tube axis, the first fin being restricted from pivoting by the restricting mechanism, the downstream end of the operation knob and the downstream end of the other second fin main body of the pair of second fin main bodies being configured to be positioned downstream of the bezel.

2. The vehicle cabin air register of claim 1, wherein the first fin and each second fin main body of the pair of second fin main bodies are disposed so as to extend along a vehicle width direction with respect to the vehicle cabin.

3. The vehicle cabin air register of claim 1, wherein:
    the pair of second fin main bodies converge from upstream ends of the pair of second fin main bodies to the minimum gap of the first flow path such that the first flow path narrows from the upstream ends of the pair of second fin main bodies to the minimum gap of the first flow path, and
    the pair of second fin main bodies diverge from the minimum gap of the first flow path to downstream ends of the pair of second fin main bodies such that the first flow path expands from the minimum gap of the first flow path to the downstream ends of the pair of second fin main bodies.

* * * * *